United States Patent
Frew

[15] 3,702,527
[45] Nov. 14, 1972

[54] PARTICLE SEPARATOR

[72] Inventor: Ronald Frew, New South Wales, Australia

[73] Assignee: The Colonial Sugar Refining Company Limited, Sydney, New South Wales, Australia

[22] Filed: July 20, 1970

[21] Appl. No.: 56,378

Related U.S. Application Data

[63] Continuation-in-part of Ser. No. 737,927, June 17, 1968, abandoned.

[30] Foreign Application Priority Data

June 19, 1967   Australia ................. 23330/67

[52] U.S. Cl. ............................................. 55/440
[51] Int. Cl. ............................................. B01d 45/08
[58] Field of Search ................... 55/440–446, 257, 55/259, 497–499

[56] References Cited

UNITED STATES PATENTS

| | | | |
|---|---|---|---|
| 2,319,894 | 5/1943 | Vokes | 55/416 |
| 600,921 | 3/1898 | Lloyd et al. | 55/444 |
| 852,122 | 4/1907 | Kinealy | 55/444 |
| 1,564,075 | 12/1925 | Lakin | 55/257 |
| 2,019,186 | 10/1935 | Kaiser | 55/440 |
| 2,256,115 | 9/1941 | Hobbs | 122/491 |
| 2,946,401 | 7/1960 | Serner | 122/491 |
| 3,272,484 | 9/1966 | Brand et al. | 261/112 |

FOREIGN PATENTS OR APPLICATIONS

| | | | |
|---|---|---|---|
| 393,022 | 10/1908 | France | 55/278 |

*Primary Examiner*—Bernard Nozick
*Attorney*—Holcombe, Wetherill and Brisebois

[57] ABSTRACT

A particle separator of improved efficiency in a duct conveying a gas stream. The separator is of the type having passages deflecting the gas stream one or more times and separating entrained liquid particles therefrom by impingement. According to the invention, the deflecting walls of the passages are formed by one or more substantially pointed corrugations, each corrugation being symmetrically shaped transversely and following its respective passage longitudinally. The particle separator of the invention is particularly suitable for reducing entrained sucrose losses in an evaporator of the type used in the manufacture of raw cane sugar, and in that application the particle separator has the additional advantage that separated liquid (aqueous sucrose) can fall back directly into the boiling liquid of the evaporator without the need to provide separate drainage means.

4 Claims, 3 Drawing Figures

PARTICLE SEPARATOR

CROSS REFERENCE TO RELATED APPLICATION

This application is a continuation-in-part of prior application Ser. No. 737,927, filed June 17, 1968, entitled "Entrainment Arrestor," now abandoned.

BACKGROUND OF THE INVENTION

1. Field of the invention

This invention relates to a particle separator in a duct conveying a gas stream. The separator is of the type having passages deflecting the gas stream one or more times and separating entrained liquid particles therefrom. Particle separators of this type are referred to hereinafter as particle separators of the mentioned type.

As used herein, "liquid particles" connotes particles of liquid per se or particles of liquid comprising dissolved or solid phase material (for example respectively, sucrose or fly ash).

2. Description of the prior art

Particle separators of the mentioned type rely on the principle that entrained liquid particles cannot change direction as readily as can the entraining gas stream. The particles are therefore prone to impinge on the deflecting walls of the passages, thus providing an opportunity for separation from the gas stream.

In particle separators of the mentioned type known hitherto, the emphasis has centered on achieving maximum efficiency of separation by (i) narrowing the passages in the appropriate dimension transversely of the gas stream and by (ii) increasing the number of opportunities for impingement, i.e., increasing the number of bends in the passages.

A simple example of a particle separator of the mentioned type is disclosed in U.S. Pat. No. 808,897 (William H. Carrier, assignor to Buffalo Forge Company), issued Jan. 2, 1906. The illustrated separator of that specification shows an arrangement of flat impervious baffle sheets defining a series of zig-zag passages through which a gas stream is made to flow.

Another example of a particle separator embodying this principle is disclosed in United Kingdom Pat. specification No. 800,189 (Babcock and Wilcox Limited), published Aug. 20, 1958. That specification describes a corrugated plate scrubber comprising an assembly of closely spaced, parallel, smoothly corrugated baffle sheets defining a series of sinuous passages through which a gas stream is made to flow.

While the known particle separators of the mentioned type can be dimensioned to have a high liquid capture efficiency it is found that this efficiency is gained at the expense of causing a high resistance to the flow of the gas stream and a correspondingly high pressure drop between the inlet and outlet of the duct.

For many applications, it is disadvantageous to impose a high resistance on the flow of the gas stream in the duct. This is particularly true in the case of a particle separator installed in a raw sugar evaporator, where it will be appreciated that a high resistance to flow would have the effect of depressing the evaporation rate and undesirably prolonging the evaporation process.

SUMMARY OF THE INVENTION

It is among the objects of the present invention to provide a particle separator of the mentioned type which is simple and economical to construct, which does not present a high resistance to a gas stream flowing therethrough, and which — even at high gas velocities — is very efficient in separating entrained liquid particles from the gas.

It is a more particular object of the invention to provide a particle separator of the mentioned type having a relatively improved liquid capture efficiency for each change of direction imposed on the gas stream by the deflecting walls of the passages.

The invention is based on the finding that the topography of the deflecting walls of the passages of a particle separator can affect the liquid capture efficiency of the separator.

In experiments leading up to the invention, streams of non-entrained liquid particles were directed on to three types of impervious sheet and a comparison was made of the relative capture efficiency thereof. The sheets were all equally inclined to the direction of particle impingement and were characterized respectively by the following surface topographies — (a) flat, (b) sinusoidally corrugated, (c) substantially pointedly corrugated.

The surface of a corrugated sheet is considered herein to comprise a number of component surfaces, each component surface being that part of the surface of the sheet between the lowermost part of a given trough and the uppermost part of the next adjacent crest. Troughs and crests are distinguished respectively as regions of concavity and convexity.

It will be understood that a sinusoidally corrugated sheet is one wherein the component surfaces are substantially S-shaped and adjacent ones of said surfaces meet at substantially 180° to define curved troughs and crests.

On the other hand, a substantially pointedly corrugated sheet is a zig-zag sheet whose component surfaces are substantially planar, and adjacent ones of said surfaces meet to define substantially pointed troughs and crests. Substantially pointedly corrugated sheets are sometimes referred to herein simply as pointedly corrugated sheets.

The corrugated sheets referred to herein are each further characterized as ones in which the component surfaces of the corrugations have substantially equal dimensions transversely, i.e. the sheets have symmetrically shaped corrugations; the planes bisecting the angles between adjacent component surfaces of the corrugations are substantially parallel to one another; and the troughs and crests of the corrugations are also substantially parallel to one another.

The two types of corrugated sheet used in the mentioned experiments had equal wave lengths and equal amplitudes. They were oriented with respect to the impinging streams of particles in one of the following two ways.

In orientation A, the particles before impingement had a component of velocity in a direction parallel to the length of the corrugations (i.e., along the corrugations) but had no component of velocity in a direction transverse thereto.

In orientation B, the particles before impingement had a component of velocity in a direction transverse to the length of the corrugations (i.e. across the corrugations) but had no component of velocity in a direction parallel thereto.

The following observations were made.

1. When particles of liquid impinge on any one of the three sheets at a sufficiently low velocity, they are completely captured by the sheet. However, as the velocity of the particles is increased, impingement becomes increasingly accompanied by splashing.
2. In the case of the flat sheet, splashed elements from the particles can only be directed away from the sheet, and the liquid capture efficiency of the sheet is therefore very much reduced as the impingement velocity of the particles is increased.
3. In the case of the sinusoidally corrugated sheet in orientation A, a distinction can be drawn between first particles impinging on the sides of the corrugations and second particles impinging on the troughs or crests. It was found that splashed elements from the first particles impinging on one side of a corrugation are prone to be directed towards the other side of the corrugation and to be captured thereon. However, splashed elements from the second particles impinging on the troughs or crests tend to be directed away from the sheet. For second particles impinging on these surfaces, therefore, the liquid capture efficiency of the sinusoidally corrugated sheet approximates that of the flat sheet.
4. In the case of the pointedly corrugated sheet in orientation A, the trough and crest surfaces are relatively very small, and impingement occurs substantially wholly on the sides of the corrugations. It was found that splashed particles impinging on one side of a corrugation are prone to be directed towards the other side of the corrugation and the overall liquid capture efficiency of the sheet is relatively very high.
5. In the case of either of the corrugated sheets in orientation B, the liquid capture efficiency is significantly reduced relative to that for orientation A. This is explained by the fact that — whether sinusoidally or substantially pointedly corrugated — the surfaces of the sheets available for impingement in orientation B are disposed in such a way as to deflect at least some splashed elements away from the sheets rather than towards other surfaces of the corrugations. The opportunities for capturing splashed elements are thus reduced.

In the light of these observations for the investigated cases, it was clear that streams of non-entrained liquid particles are most efficiently captured by pointedly corrugated sheets in orientation A. From this it was inferred that liquid particles when entrained in a gas stream would also be most efficiently captured by pointedly corrugated sheets in this orientation.

The particle separator according to the invention makes use of this inference, deflecting walls of the passages thereof being formed by one or more substantially pointed corrugations in orientation A with respect to the direction of flow of the gas stream.

It is believed that the liquid capture efficiency of the particle separator according to the invention may derive in part from the fact that the provision of substantially pointed corrugations in this orientation enables regions of relatively reduced gas velocity to be established in which capture is favored of both entrained liquid particles and splashed elements thereof.

In the simplest construction, the deflecting walls of the passages are provided by an assembly consisting of a plurality of pointedly corrugated sheets in this orientation.

It will be understood that the number of sheets in an assembly, their nature, dimensions, and relative separation, are best selected interdependently with regard to the duct in which the particle separator is to be accommodated, the desired inclination of the separator passages, the conditions of the gas stream, and the required degree of liquid capture efficiency.

For ease and economy of construction, the corrugations of the sheets of an assembly are preferably each uniform throughout and all substantially identical. The description hereinafter relates to a particle separator comprising an assembly of such regular sheets.

The liquid capture efficiency of the separator is favored by inclining the corrugated sheets in the duct in such a way as to increase the degree of deflection suffered by the gas stream passing through the passages. There is, however, the disadvantage that any increase in the degree of deflection suffered by the gas stream entails a corresponding increase in the pressure drop between the inlet and outlet of the duct. It follows therefore that a compromise must be sought depending on the relative requirements of efficiency and pressure drop in any given case.

Transversely adjacent sheets of an assembly can either be spaced apart from each other (see the description hereinafter with respect to FIG. 2), or they can be in contact with each other at their crests (see the description hereinafter with respect to FIG. 3). In the former case the deflecting walls of the passages are each formed by a plurality of corrugations, whereas in the latter case each deflecting wall of a passage is formed by a single corrugation and the passages are essentially diamond-shaped in cross-section.

It will be appreciated that the total assembly of corrugated sheets can be arranged to provide passages for deflecting the gas stream one or more times when passing therethrough.

When the passages deflect the gas stream once only, the particle separator is considered herein to be a single stage type. When the gas stream is deflected twice, the particle separator is considered to be a two stage type; and so on.

As in all particle separators of the mentioned type, by increasing the number of stages (i.e., increasing the number of bends in the passages) it is possible significantly to reduce the likelihood of any entrained liquid particle escaping from the separator. However, by virtue of the corrugated surface topography according to the invention, a desired degree of liquid capture can be achieved with a smaller number of stages than would be required in an otherwise comparable device according to the prior art.

The corrugated sheets can be made of any material which is stable under the conditions in which the particle separator is to be used. When used in conjunction with a raw sugar evaporator, a serviceable material is, for example, steel; however, when conditions are less severe it is possible to use, for example, resin-impregnated paper.

It will be understood that the successful installation and performance of a given particle separator in a duct may be dependent on the provision of various ancillary means such as (i) supporting means, for example plates, for maintaining the component sheets of the separator in their desired inclination in the duct; and (ii) gas inpervious sealing means, for example plates, provided where necessary to ensure that the gas stream must pass through the separator. Particularly in the case of a separator installed in a duct having a horizontal axis, it may also be necessary to provide (iii) drainage means, for example gutters, for collecting liquid captured by the separator. All such means are well known in the art and are not discussed herein.

BRIEF DESCRIPTION OF THE DRAWING T

DESCRIPTION OF THE PREFERRED EMBODIMENTS

As is well known, raw sugar evaporators comprise a bottom section housing a calandria, and a vertical cylindrical body thereabove of large diameter (referred to hereinafter as a vertical duct) leading via a vapor pipe to a condenser or to another evaporator.

Figure 1:
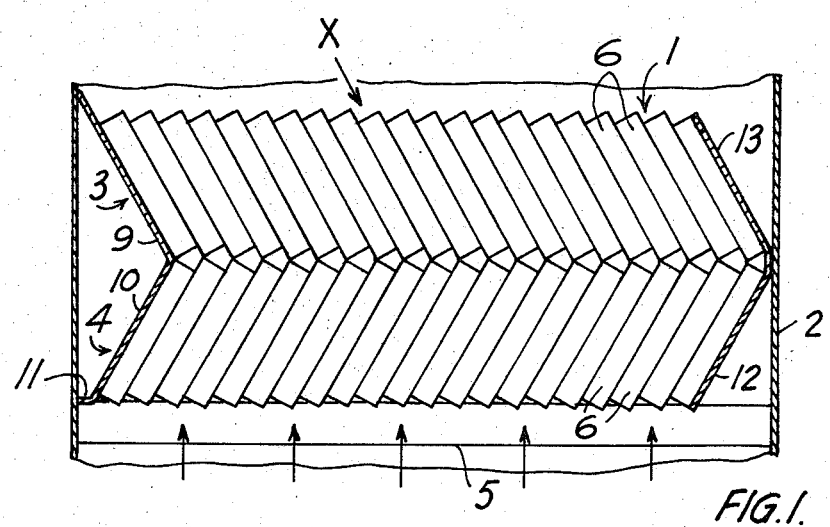
FIG. 1 illustrates in sectional elevation a two stage particle separator according to one or other of two preferred embodiments of the present invention.

FIG. 1 illustrates in sectional elevation a particle separator indicated generally as 1, installed in the vertical duct 2 conveying a rising gas stream in a mentioned evaporator (other parts thereof not shown).

The separator is a two stage type comprising an upper stage 3 and lower stage 4. The whole assembly is maintained in the duct by horizontally narrow beams, such as 5. Each stage is formed by a number of pointedly corrugated steel sheets 6 inclined at a suitable angle (for example, 30°) to the normal vertical direction of travel of the gas stream. Conveniently, the corrugated sheets each have the following dimensions:

| | |
|---|---|
| Length of corrugation | 1 foot |
| Wave length | 2¼ inch |
| Angle between adjacent component surfaces | 60° |

Figure 2:
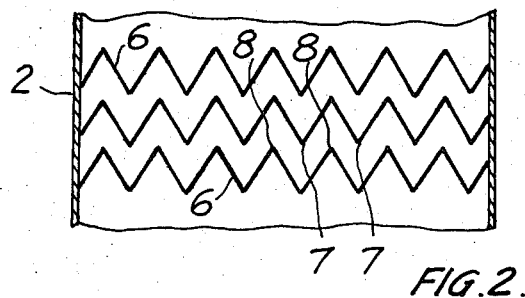
FIG. 2 is a part section of one preferred embodiment of the particle separator of FIG. 1 viewed along the direction X thereof.

In the first preferred embodiment, the transversely adjacent corrugated sheets of each stage of the assembly are spaced apart from each other. When spaced apart, the crests (regions of convexity) of any sheet can be near to, though not touching, the proximal crests of an adjacent sheet; but preferably, they are staggered in relation thereto. FIG. 2 is a part section of the particle separator of FIG. 1 when so constructed viewed along direction X thereof. Spacer rods (not shown) may be included between the sheets if required to keep them spaced apart; alternatively, the sheets can be kept apart by rigidly securing them at the required spacing to the walls of the duct. The figure illustrates only three transversely adjacent, spaced apart sheets 6, showing crests such as 7 and proximal crests such as 8 in the mentioned staggered relationship.

Figure 3:
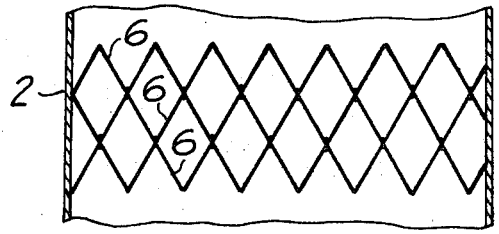
FIG. 3 is a part section of the mentioned other preferred embodiment of the particle separator of FIG. 1 viewed along the direction X thereof.

In the second preferred embodiment, the transversely adjacent corrugated sheets of each stage are in contact with each other at their crests, and passages formed thereby are diamond-shaped in cross-section. FIG. 3 is a view similar to FIG. 2, showing a part section of the particle separator of FIG. 1 when so constructed, viewed also along direction X thereof. FIG. 3 likewise illustrates only three transversely adjacent sheets 6.

The sheets of each stage extend transversely across the duct to the walls thereof, but gas impervious sealing plates, 9, 10, 11, 12, 13 are provided as shown to prevent the gas stream by-passing the separator.

In use, the gas stream rising from the boiling liquid of the evaporator is deflected once as it is channelled into the inclined passages of the lower stage, and is deflected again as it is channelled into the differently inclined passages of the upper stage. The separator is self-draining, liquid separated in the upper stage combining with liquid separated in the lower stage and falling back directly into the boiling liquid of the evaporator in the form of droplets and/or streamlets of a size large enough not to be easily re-entrained by the rising gas stream.

EXAMPLE

A two-stage assembly of pointedly corrugated steel sheets was installed in the body of a raw cane sugar evaporator after the manner described in relation to FIGS. 1 and 2. The dimensions of the sheets approximated those mentioned earlier herein as being suitable.

In operation, it was found that with the evaporator working at a vacuum of 27 inches Hg and with a vapor rate through the separator passages of 0.36 lb./sq.ft./sec., the overall rate of sucrose loss from the evaporator was less than 0.15 lb./sq.ft./hr. The area referred to in this rate of sucrose loss was calculated as the cross-sectional area of the passages measured horizontally. The pressure drop across the particle separators was less than 1 inch W.G. This performance is very satisfactory.

The invention has been described with special reference only to particle separators installed in a duct having a vertical axis and conveying a rising gas stream having particles of sucrose solution entrained therein. However, it will be appreciated that the separators according to the invention have utility also when installed in ducts whose axes are oriented differently: for example, horizontally. Again, the separators can clearly be used in ducts conveying gas streams having different liquid particles entrained therein: for example, the separator has been found to have particular utility in scrubbing particles of wetted fly ash from a gas stream.

I claim:

1. In a particle separator mounted in a duct having an inlet and an outlet,
said duct being adapted to convey a gas stream having liquid particles entrained therein in a given direction from said inlet to said outlet,
said particle separator comprising a plurality of successive stages and each stage comprising a plurality of impervious, non-absorbent corrugated sheets extending across said duct and constituting the walls of a plurality of passages conveying the gas stream through the duct, each passage having walls inclined to said given direction thereby deflecting the gas stream passing through said passage and consequently separating entrained liquid particles from said gas by impingement, the improvement according to which each sheet has substantially pointed corrugations which define transversely symmetrically shaped troughs having opposed substantially planar sides which meet at a sharp angle, the planes bisecting the angles defined by said troughs being substantially parallel to each other and to said given direction, and the sheets defining the walls of successive stages lying at an angle to each other.

2. The particle separator according to claim 1 in which each sheet comprises a plurality of substantially planar component surfaces, with half of the pairs of adjacent surfaces meeting to define substantially pointed troughs and the other half of said pairs of adjacent surfaces defining substantially pointed crests, and the troughs and crests in any one stage are substantially parallel to each other.

3. The particle separator according to claim 2, wherein said sheets constituting a single stage are spaced apart from each other transversely, the crests of any one said sheet being staggered in relation to the proximal crests of a said sheet adjacent thereto.

4. The particle separator according to claim 2, wherein said sheets constituting a single stage are in contact with each other transversely, the crests of any one said sheet touching the proximal crests of a said sheet adjacent thereto.

* * * * *